(12) United States Patent
Liu

(10) Patent No.: US 10,006,528 B2
(45) Date of Patent: Jun. 26, 2018

(54) PENDULUM DEVICE

(71) Applicant: Li Chun Liu, Taichung (TW)

(72) Inventor: Li Chun Liu, Taichung (TW)

( * ) Notice: Subject to any disclaimer, the term of this patent is extended or adjusted under 35 U.S.C. 154(b) by 34 days.

(21) Appl. No.: 15/367,662

(22) Filed: Dec. 2, 2016

(65) Prior Publication Data
US 2017/0167582 A1  Jun. 15, 2017

(30) Foreign Application Priority Data

Dec. 15, 2015 (TW) .............................. 104142041 A

(51) Int. Cl.
*F16H 19/06* (2006.01)
*B29C 31/04* (2006.01)

(52) U.S. Cl.
CPC ....... *F16H 19/0659* (2013.01); *B29C 31/042* (2013.01)

(58) Field of Classification Search
CPC ............ B29C 31/042; B29C 2049/044; B29C 2049/047; B29C 2047/054; B29C 2049/045
See application file for complete search history.

(56) References Cited

U.S. PATENT DOCUMENTS

| | | | | |
|---|---|---|---|---|
| 3,523,330 A | * | 8/1970 | Gallay | B29C 49/58 425/317 |
| 4,998,873 A | * | 3/1991 | Martin | B29C 49/36 425/450.1 |
| 5,229,143 A | * | 7/1993 | Ogura | B29C 49/04 425/451.6 |
| 5,478,229 A | * | 12/1995 | Kato | B29C 49/32 264/532 |
| 8,500,439 B2 | * | 8/2013 | Muller | B29C 47/0023 264/540 |

* cited by examiner

*Primary Examiner* — Robert B Davis
(74) *Attorney, Agent, or Firm* — Rosenberg, Klein & Lee

(57) ABSTRACT

A pendulum device includes a base. A rotating plate is pivoted on the base. A movable member is eccentrically pivoted on the rotating plate by one of two ends thereof, and the other end of the movable member is for connecting to an article to be operated. A driving unit is at one side of the base. The driving unit is for driving the rotating plate of the base to perform a uniform circular motion. Because of the movable member eccentrically pivoted on the rotating plate, when the operating end is connected to the article, the operating end is dragged by the transmission of the rotating plate to perform a simple harmonic motion that is a variable accelerating linear motion relative to the rotating plate.

8 Claims, 7 Drawing Sheets

PENDULUM DEVICE

BACKGROUND OF THE INVENTION

Field of the Invention

The present invention relates to a pendulum device, in particular to a pendulum device utilizing the simple harmonic motion to drive an article to be moved to move.

Description of the Prior Art

Conventionally, a plastic material feeder can be used for receiving plastic materials. After the plastic materials are hot melted and transmitted, the plastic materials are outputted by an output portion of the plastic material feeder. A mold is below the output portion to load plastic materials outputted by the output portion for following setting procedures.

During the setting procedure, the mold is moved in a transversal direction relative to a material output position for a subsequent releasing procedure. However, the distance between the output portion and the mold is fixed. Therefore, when the mold is moved in the transversal direction to move away from the position below the output portion, the melted and viscous plastic materials near to the output portion are continuously outputting downward by the gravity, so that the plastic materials that are continuously outputted from the output portion may adhere to or collide with the mold. As a result, the overall performance of the feeder is adversely affected and reduced.

A conventional feeder is developed, wherein the output portion of the feeder can be moved upward relative to the mold. Therefore, the distance between the output portion and the mold can increase to prevent the plastic materials from adhering to or colliding with the mold. However, such feeder is directly driven by a driving mechanism to allow the mold to perform an up-and-down movement. Therefore, during the movement of the output portion, a moderate oscillation may be generated. As a result, the components of the feeder or the driving mechanism may collide with or wear against each other to reduce the period of use. Moreover, the oscillation may adversely affect the operation of the material output of the output portion and the efficiency of the feeder.

SUMMARY OF THE INVENTION

One object of the present invention is to provide a pendulum device. Because of the features of the simple harmonic motion performed by the pendulum device, a buffering effect can be provided during the pendulum device is moved to a top position or a bottom position in upward or downward movements.

In view of these, the pendulum device comprises a base, a movable member, and a driving unit. The base has an assembling portion for assembling on an assembling surface and has a rotating plate rotatable relative to the base. One of two ends of the movable member is a force bearing end and the other end of the movable member is an operating end. The movable member is eccentrically pivoted on the rotating plate by the force bearing end. The operating end of the movable member is for connecting to an article to be operated. The driving unit is assembled on one side of the base. The driving unit is for driving the rotating plate of the base to perform a uniform circular motion. Because of the movable member eccentrically pivoted on the rotating plate, when the operating end is connected to the article to limit the operating end to move linearly, the operating end is dragged by the transmission of the rotating plate to perform a simple harmonic motion that is a variable accelerating linear motion relative to the rotating plate.

In one embodiment, the operating end of the movable member is pivoted on a pressing member for fixedly connecting to the article.

In one embodiment, the driving unit has a push bar being movable in a transversal direction. A shift member is disposed below the push bar. When the push bar of the driving unit moves reciprocally in the transversal direction, the push bar drives the shift member to move. The base comprises a transmission gear. An upper portion of transmission gear is movably engaged with the shift member. A transmission shaft is extending out of the base from the center of the transmission gear, and the rotating plate is assembled on the transmission shaft.

Furthermore, the shift member is a chain member.

Furthermore, a central assembling hole is at a center of one of two sides of the rotating plate and facing the transmission shaft; an eccentric assembling hole is on the other side of the rotating plate and far from the transmission shaft. The central assembling hole of the rotating plate is assembled on the transmission shaft, so that the rotating plate is coaxially rotated along with the transmission shaft, and the force bearing end of the movable member is eccentrically pivoted on the eccentric assembling hole of the rotating plate.

In one embodiment, the pendulum device is pivoted on a bottom of a feeder by the operating end of the movable member. The feeder comprises a feeding portion, a transmission portion, and an output portion. The transmission portion is between the feeding portion and the output portion. Plastic materials are allowed to be inputted into the transmission portion for heating from the feeding portion. And then, the plastic materials are allowed to be delivered to the output portion for output through the transmission portion. A supporting mechanism is pivoted on one of two ends of the bottom of the feeder. The pendulum device is at one side of the supporting mechanism. The operating end of the movable member is pivoted on the other end of the bottom of the feeder. When the driving unit drives the force bearing end of the movable member, the driving unit also drives the operating end to move along an up-and-down direction, so that the feeder is driven to perform a pendulum motion using the supporting mechanism as a fulcrum.

Furthermore, one of two ends of the supporting mechanism forms a fixed end, and the other end of the supporting mechanism forms a pivot end. The supporting mechanism is fixedly connected to an operating surface by the fixed end, the pivot end of the supporting mechanism is pivoted on one end of the bottom of the feeder.

Furthermore, when the force bearing end of the movable member is moved to the bottommost position of the rotating plate along with the rotation of the rotating plate, the bottom of the feeder is aligned parallel with the operating surface.

DETAIL PORTIONED DESCRIPTION OF THE PREFERRED EMBODIMENTS

Figure 1:
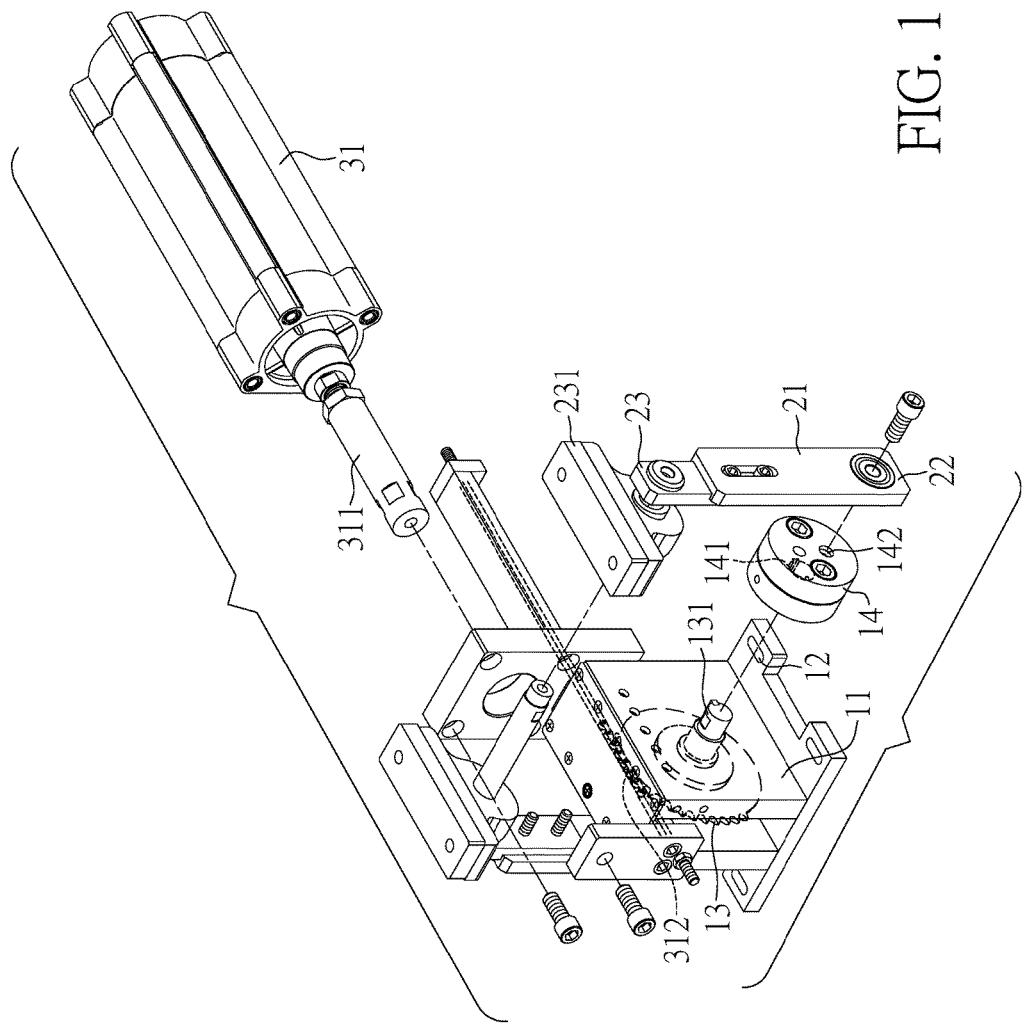
FIG. 1 illustrates an exploded view of a pendulum device according to an exemplary embodiment of the present invention.
Figure 2:
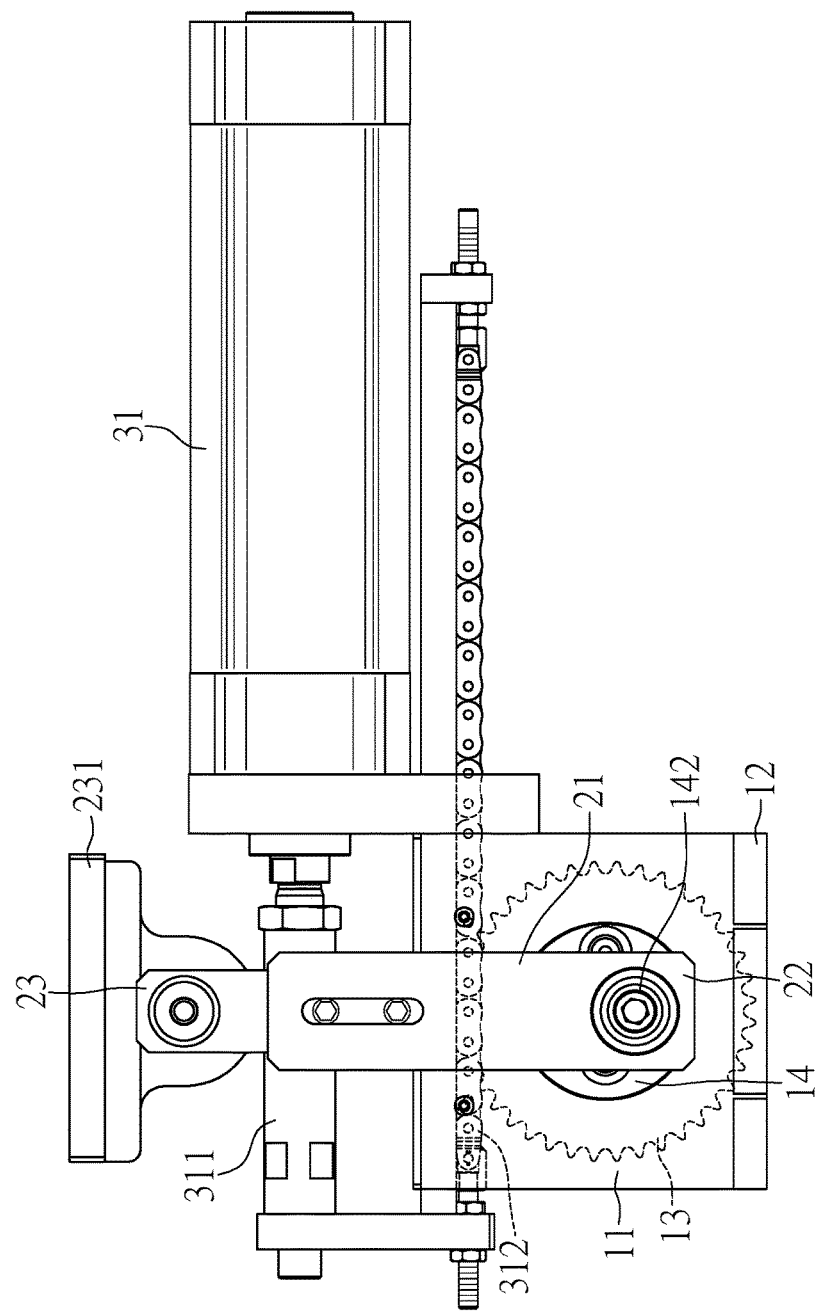
FIG. 2 illustrates a structural schematic view of the pendulum device.
Figure 3:
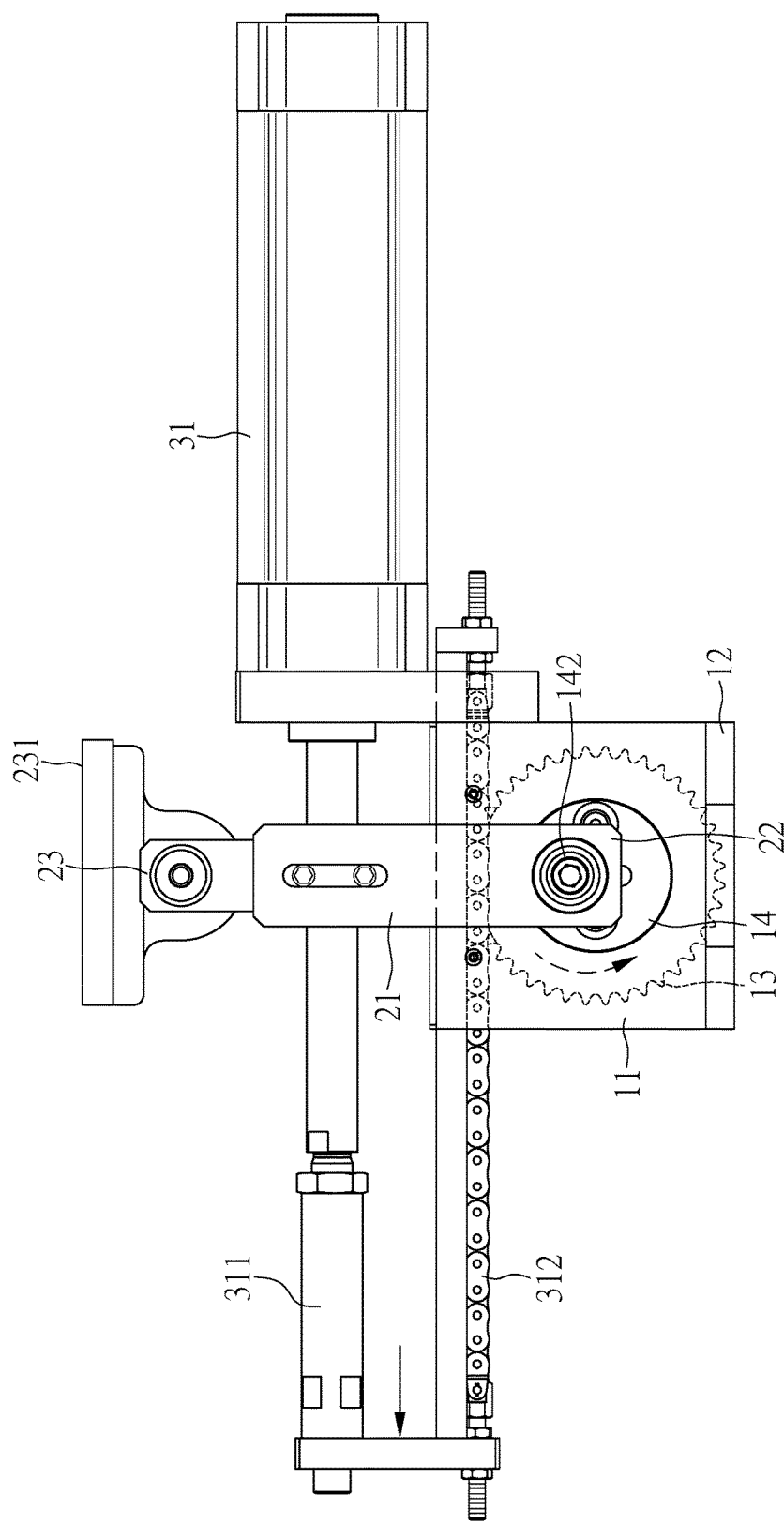
FIG. 3 illustrates an operational view of the pendulum device in which the operation of the driving unit is done.

Please refer to FIGS. 1 to 3, which illustrate a pendulum device comprising a base 11, a movable member 21, and a driving unit 31.

The bottom of the base 11 has an assembling portion 12, so that the base 11 is assembled to an assembling surface (not shown) by the assembling portion 12. The base 11 comprises a transmission gear 13, and a transmission shaft 131 is extending out of the base 11 from the center of the transmission gear 13. A rotating plate 14 is assembled on the transmission gear 13. A central assembling hole 141 is at the center of one of two sides of the rotating plate 14 and facing the transmission shaft 131, and an eccentric assembling hole 142 is on the other side of the rotating plate 14, far from the transmission shaft 131, and far from the center of the rotating plate 14. The central assembling hole 141 of the rotating plate 14 is assembled on the transmission shaft 131, so that the rotating plate 14 is coaxially rotated along with the transmission shaft 131.

One of two ends of the movable member 21 is a force bearing end 22, and the other end thereof is an operating end 23. The movable member 21 is eccentrically pivoted on the rotating plate 14 by the force bearing end 22, and the operating end 23 of the movable member 21 is further pivoted with a pressing member 231 for connecting to an article to be operated (not shown).

Figure 4:
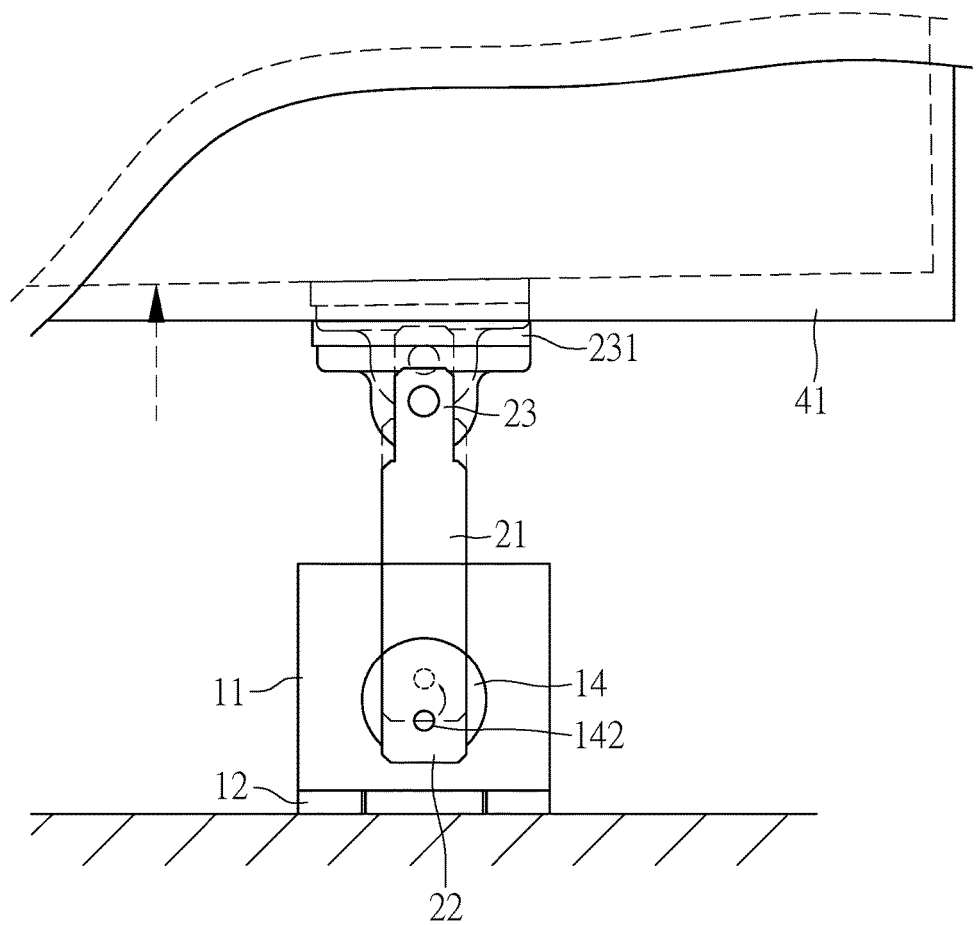
FIG. 4 illustrates a schematic view showing the pendulum device is in transmission.

The driving unit 31 is assembled on one side of the base 11. In this embodiment, the driving unit 31 is a pneumatic cylinder, and the driving unit 31 has a push bar 311 that is movable in a transversal direction. A shift member 312, (here, the shift member 312 is a chain), is disposed below the push bar 311. The push bar 311 and the shift member 312 are aligned parallel. An upper portion of the transmission gear 313 is movably engaged with the shift member 312. When the push bar 311 of the driving unit 31 moves reciprocally in the transversal direction, the shift member 312 is driven and moved in the transversal direction reciprocally. At this moment, because the shift member 312 is movably engaged with the transmission gear 313, the shift member 312 can drive the transmission gear 313 and the rotating plate 14 simultaneously to perform a uniform circular motion using the transmission shaft 131 as a rotating center. Moreover, the force bearing end 22 of the movable member 21 is eccentrically pivoted on the rotating plate 14. Therefore, when the pressing member 231 of the operating end 23 of the movable member 21 is connected to an article 41 to limit the operating end 23 of the movable member 21 to move in an up-and-down direction, as shown in FIG. 4, the movable member 21 is moved along the peripheral direction of the rotating plate 14 during the rotation of the rotating plate 14, and the operating end 23 of the movable member 21 and the pressing member 231 are driven to perform a simple harmonic motion that is a variable accelerating linear motion relative to the rotating plate 14. Because of the features of the simple harmonic motion, a buffering effect can be provided during the operating end 23 is moved to a top position or a bottom position in upward or downward movements.

Figure 5:
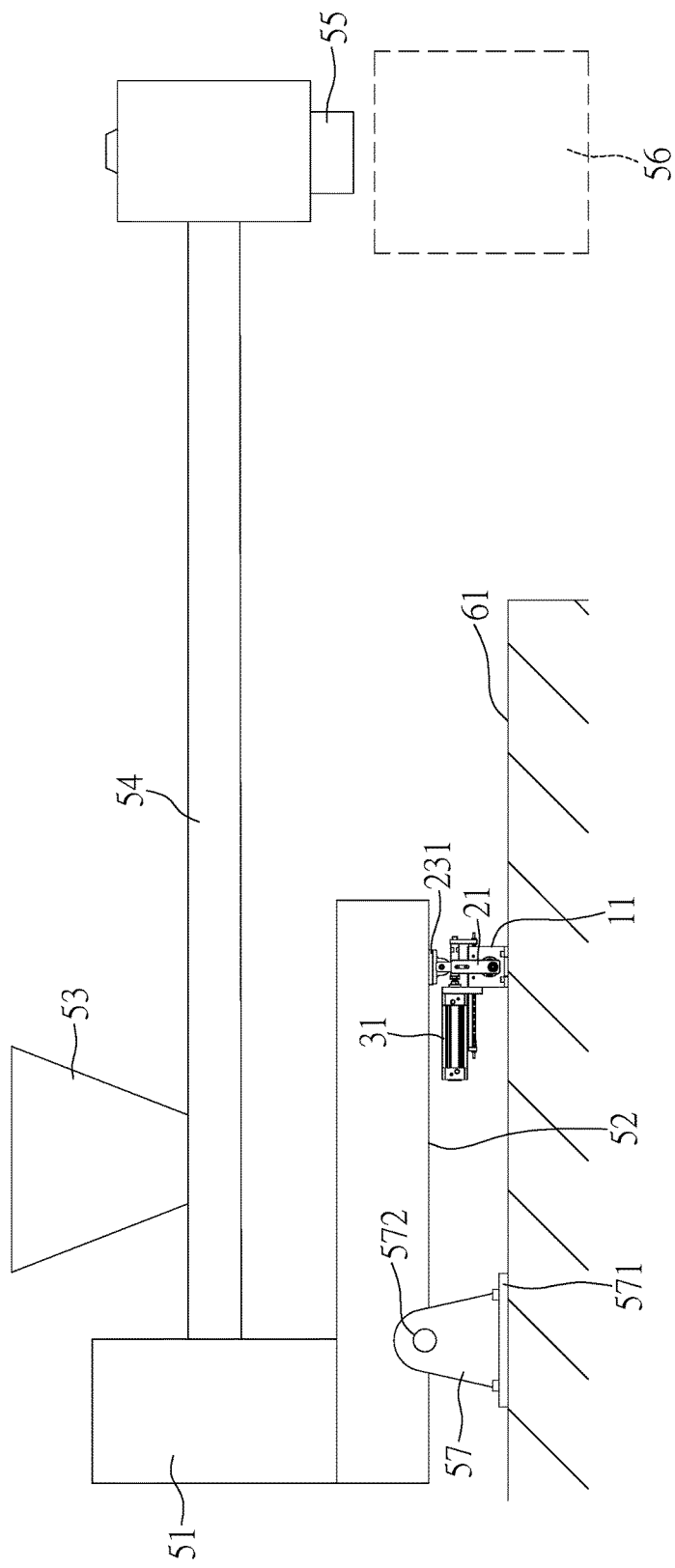
FIG. 5 illustrates an operational view showing that the pendulum device is assembled on a plastic material feeder.
Figure 6:
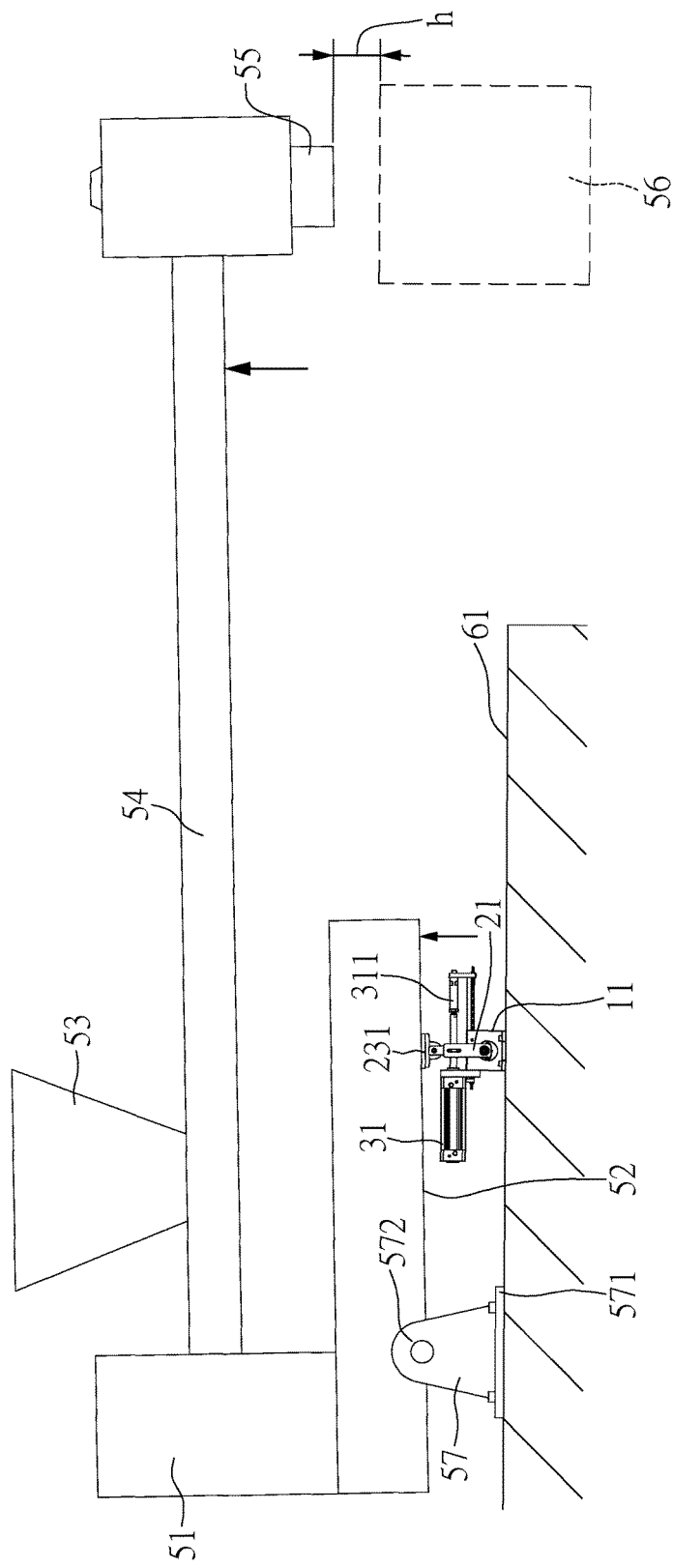
FIG. 6 illustrates an operational view showing that the pendulum device pushes the plastic material feeder upward.

Please refer to FIGS. 5 and 6, illustrating the pendulum device utilized to a plastic material feeder 51. The lower portion of the plastic material feeder 51 has a bottom 52. The plastic material feeder 51 comprises a feeding portion 53, a transmission portion 54, and an output portion 55 sequentially connected with each other. The transmission portion 54 is between the feeding portion 53 and the output portion 55. The plastic materials are inputted into the transmission portion 54 for heating from the feeding portion 53. Next, the plastic materials are delivered to the output portion 55 for output through the transmission portion 54. A mold 56 is below the output portion 55 to load outputted materials. A supporting mechanism 57 is pivoted on the bottom 52 of the plastic material feeder 51. One of two ends of the supporting mechanism 57 forms a fixed end 571 and the other end of the supporting mechanism 57 forms a pivot end 572. The supporting mechanism 57 is fixedly connected to an operating surface 61 by the fixed end 571, and the pivot end 572 of the supporting mechanism 57 is pivoted on one of two ends of the bottom 52 of the plastic material feeder 51.

According to the invention, the assembling portion 12 of the pendulum device is fixedly assembled on the operating surface 61 and is at one side of the supporting mechanism 57. In addition, the pressing member 231 on the operating end 23 of the movable member 21 is penetrated by several fixing pieces (not shown) to be fixedly connected to the other end of the bottom 52 of the plastic material feeder 51. When the force bearing end 22 of the movable member 21 is moved to the bottommost position of the rotating plate 14 along with the rotation of the rotating plate 14, the bottom 52 of the plastic material feeder 51 is aligned parallel with the operating surface 61.

Accordingly, when the movable member 21 on the rotating plate 14 is rotated along the peripheral direction of the rotating plate 14 along with the rotation of the rotating plate 14, the operating end 23 of the movable member 21 and the pressing member 231 are driven to perform an up-and-down movement, and a force is generated to drag and abut against the other end of the bottom 52 of the plastic material feeder 51. Therefore, the plastic material feeder 51 can perform a reciprocal pendulum motion using the supporting mechanism 57 as a fulcrum. When the plastic material feeder 51 performs the reciprocal pendulum motion using the supporting mechanism 57 as the fulcrum, the distance between the output portion 55 and the mold 56 can be changed. Therefore, when the mold 56 is moved away from a position below the output portion 55, the output portion 55 is lifted up and the distance h between the output portion 55 and the mold 56 can be increased. Accordingly, because of the increased buffering distance between the output portion 55 and the mold 56, the plastic materials that are continuously outputted from the output portion 55 due to the gravity can be prevented from being adhered to or collided with the mold 56.

The movable member 21 is disposed on the rotating plate 14 by the force bearing end 22. The pressing member 231 on the operating end 23 of the movable member 21 is pivoted with the other end of the bottom 52 of the plastic material feeder 51 to limit the operating end 23 to move in the up-and-down movement only. Therefore, when the rotating plate 14 is driven by the driving unit 31 to perform a uniform circular motion, the operating end 23 of the movable member 21 and the pressing member 231 perform a simple harmonic motion that is a variable accelerating motion relative to the rotating plate 14.

Figure 7:
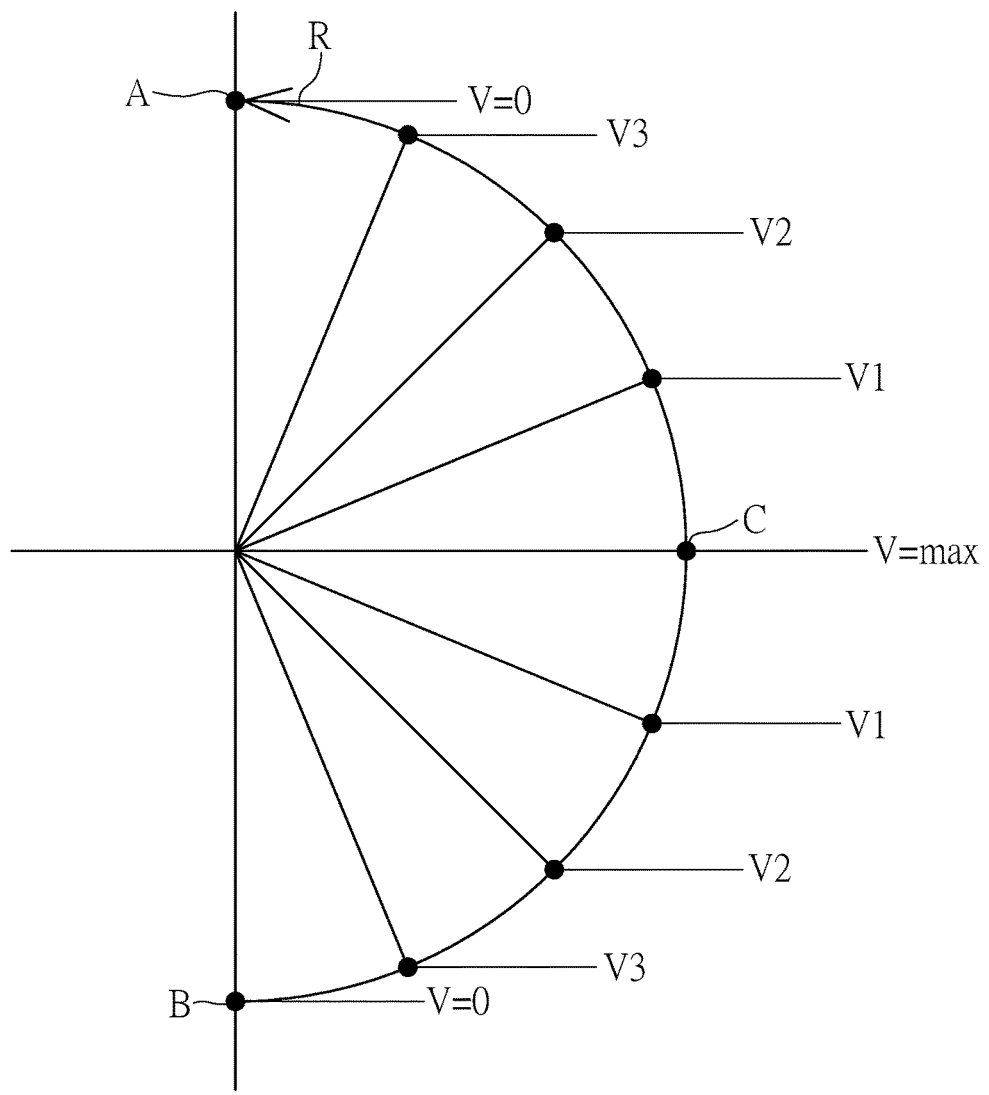
FIG. 7 illustrates a schematic view showing the motion trace of a movable member of the pendulum device.

As shown in FIG. 7, the movable member 21 (not shown in FIG. 7) performs a circular motion along a peripheral path R in a counterclockwise manner. Therefore, when the movable member 21 is moved to the top position A or the bottom position B of the peripheral path R, the velocity component along the vertical direction is zero (since in such condition, the movable member 21 only has the velocity along the horizontal direction); i.e., V=0. When the movable member 21 is moved along the peripheral path R from the bottom position B to the left position C, the velocity component along the vertical direction gradually increases; i.e., V3>V2>V1. When the movable member 21 is at the left side position C of the peripheral path R, now the movable member 21 only has the velocity component along the vertical direction, and the velocity of the movable member 21 along the vertical direction is maximized; i.e., V=MAX.

In other words, when the force bearing end 22 of the movable member 21 is moved from the bottom position, the side position (left side position or right side position), to the top position of the rotating plate 14, the velocity for pushing the movable member 21 upward are respectively slow, fast, and slow. Moreover, the output portion 55 of the plastic material feeder 51 can perform the pendulum motion corresponding to the velocity of the movable member 21. Therefore, during the movable member 21 is in an upward movement or a downward movement, when the movable member 21 is at the top position or the bottom position, buffering effects can be provided for both cases. As a result, the swing velocity of the output portion 55 of the plastic material feeder 51 can be reduced when the output portion 55 is at a position which is closest to or farthest from the mold 56. Accordingly, the output portion 55 can be prevented from colliding with the mold 56, and the oscillation during the operation of the device can be reduced efficiently to prolong the period of use of the components within the device.

Additionally, the pendulum device is a simple structure, and the stroke of the pendulum device can have buffering effects because of the simple harmonic motion generated by the pendulum device. Therefore, there is no need to control the velocity of the strokes by manual means or computers. As a result, the cost for controlling the strokes can be greatly reduced.

What is claimed is:

1. A pendulum device, comprising:
   a base having an assembling portion for assembling on an assembling surface and having a rotating plate rotatable relative to the base;
   a movable member, one of two ends thereof being a force bearing end, and the other end thereof being an operating end, wherein the movable member is eccentrically pivoted on the rotating plate by the force bearing end, and the operating end of the movable member is for connecting to an article to be operated; and
   a driving unit assembled on one side of the base, wherein the driving unit is for driving the rotating plate of the base to perform a uniform circular motion, wherein because of the movable member eccentrically pivoted on the rotating plate, when the operating end is connected to the article to limit the operating end to move linearly, the operating end is dragged by the transmission of the rotating plate to perform a simple harmonic motion that is a variable accelerating linear motion relative to the rotating plate.

2. The pendulum device according to claim 1, wherein the operating end of the movable member is pivoted on a pressing member for fixedly connecting to the article.

3. The pendulum device according to claim 1, wherein the driving unit has a push bar being movable in a transversal direction, a shift member is disposed below the push bar, wherein when the push bar of the driving unit moves reciprocally in the transversal direction, the push bar drives the shift member to move; the base comprises a transmission gear, an upper portion of the transmission gear is movably engaged with the shift member, a transmission shaft is extending out of the base from a center of the transmission gear, and the rotating plate is assembled on the transmission shaft.

4. The pendulum device according to claim 3, wherein the shift member is a chain member.

5. The pendulum device according to claim 3, wherein a central assembling hole is at a center of one of two sides of the rotating plate and facing the transmission shaft, an eccentric assembling hole is on the other side of the rotating plate and far from the transmission shaft, the central assembling hole of the rotating plate is assembled on the transmission shaft, so that the rotating plate is coaxially rotated along with the transmission shaft, and the force bearing end of the movable member is eccentrically pivoted on the eccentric assembling hole of the rotating plate.

6. The pendulum device according to claim 1, wherein the pendulum device is pivoted on a bottom of a feeder by the operating end of the movable member, the feeder comprises a feeding portion, a transmission portion, and an output portion, the transmission portion is between the feeding portion and the output portion; plastic materials are allowed to be inputted into the transmission portion for heating from the feeding portion, and then the plastic materials are allowed to be delivered to the output portion for output through the transmission portion; a supporting mechanism is pivoted on one of two ends of the bottom of the feeder, the pendulum device is at one side of the supporting mechanism, the operating end of the movable member is pivoted on the other end of the bottom of the feeder; when the driving unit drives the force bearing end of the movable member, the driving unit also drives the operating end to move along an up-and-down direction, so that the feeder is driven to perform a pendulum motion using the supporting mechanism as a fulcrum.

7. The pendulum device according to claim 6, wherein one of two ends of the supporting mechanism forms a fixed end, and the other end of the supporting mechanism forms a pivot end, the supporting mechanism is fixedly connected to an operating surface by the fixed end, the pivot end of the supporting mechanism is pivoted on one end of the bottom of the feeder.

8. The pendulum device according to claim 7, wherein when the force bearing end of the movable member is moved to a bottommost position of the rotating plate along with the rotation of the rotating plate, the bottom of the feeder is aligned parallel with the operating surface.

* * * * *